(12) United States Patent
Campbell et al.

(10) Patent No.: US 8,075,835 B2
(45) Date of Patent: Dec. 13, 2011

(54) METHOD OF THERMOFORMING USING A SYNTACTIC FOAM PLUG

(75) Inventors: Richard W. Campbell, Reinholds, PA (US); Noel J. Tessier, North Attleboro, MA (US)

(73) Assignee: CMT Materials, Inc., Attleboro, MA (US)

( * ) Notice: Subject to any disclaimer, the term of this patent is extended or adjusted under 35 U.S.C. 154(b) by 0 days.

(21) Appl. No.: 11/394,668

(22) Filed: Mar. 29, 2006

(65) Prior Publication Data

US 2006/0210788 A1    Sep. 21, 2006

Related U.S. Application Data

(63) Continuation of application No. 11/005,242, filed on Dec. 7, 2004, now abandoned, which is a continuation of application No. 10/052,491, filed on Jan. 23, 2002, now abandoned, which is a continuation of application No. PCT/NL00/00536, filed on Jul. 27, 2000.

(60) Provisional application No. 60/145,821, filed on Jul. 27, 1999.

(51) Int. Cl.
*B29C 51/08* (2006.01)
*B29C 51/20* (2006.01)

(52) U.S. Cl. ........................................ 264/549; 264/550

(58) Field of Classification Search .................. None
See application file for complete search history.

(56) References Cited

U.S. PATENT DOCUMENTS

| 3,386,870 A |   | 6/1968  | Morin |
|---|---|---|---|
| 3,911,516 A |   | 10/1975 | Einhorn |
| 3,995,409 A |   | 12/1976 | Discavage et al. |
| 3,995,820 A |   | 12/1976 | Einhorn |
| 4,025,686 A |   | 5/1977  | Zion |
| 4,239,727 A | * | 12/1980 | Myers et al. ................. 264/550 |
| 4,916,173 A |   | 4/1990  | Otloski |
| 5,120,769 A |   | 6/1992  | Dyksterhouse et al. |
| 5,356,958 A | * | 10/1994 | Matthews ..................... 523/219 |
| 5,507,999 A |   | 4/1996  | Copsey et al. |
| 5,597,522 A |   | 1/1997  | Curzon et al. |
| 5,641,524 A | * | 6/1997  | Rush et al. .................... 425/384 |
| 5,683,646 A | * | 11/1997 | Reiling, Jr. ................... 264/512 |
| 5,691,390 A |   | 11/1997 | Harrison et al. |
| 5,798,079 A |   | 8/1998  | Freek et al. |
| 5,900,300 A |   | 5/1999  | Slaven |
| 6,022,613 A |   | 2/2000  | Ren |

FOREIGN PATENT DOCUMENTS

| DE | 28 01 990 | 7/1979 |
|---|---|---|
| GB | 1054171 | 1/1967 |
| WO | WO89/00100 | 12/1989 |

OTHER PUBLICATIONS

International Search Report for PCT/NL00/00536, Nov. 2000.

\* cited by examiner

*Primary Examiner* — Edmund H. Lee
(74) *Attorney, Agent, or Firm* — Bowditch & Dewey, LLP

(57) ABSTRACT

The present invention provides an improved syntactic foam plug for plug assist thermoforming wherein such plug is composed of a thermoplastic material having a relatively high melting and/or glass transition temperature. Accordingly, the subject invention encompasses diminishing or removing the undesirable characteristics of thermoset syntactic plugs while increasing the ease by which these articles may be constructed for a given use, by forming such plugs from syntactic foams containing thermoplastics.

27 Claims, No Drawings

METHOD OF THERMOFORMING USING A SYNTACTIC FOAM PLUG

CROSS REFERENCE TO RELATED APPLICATIONS

This is a continuation of U.S. patent application Ser. No. 11/005,242, filed Dec. 7, 2004, now abandoned, which is a continuation application of U.S. patent application Ser. No. 10/052,491, filed Jan. 23, 2002, now abandoned, which is a continuation of International Patent Application No. PCT/NL00/00536 filed Jul. 27, 2000, which claims the benefit of U.S. Provisional Patent Application No. 60/145,821, filed Jul. 27, 1999, now abandoned.

BACKGROUND OF THE INVENTION

1. Field of the Invention

This invention relates to thermoplastic matrix syntactic foam plugs for use in plug assist thermoforming and the process of making and using the same. In particular the present invention relates to forming syntactic foam plugs from thermoplastic matrix material having a melting temperature and/or glass transition temperature at least 5° C. higher than the operating design temperature of the thermoforming process.

2. Background Art

A plug, or plug assist, is a male tool used in the art of plug assist thermoforming which begins stretching a molten web of material into a females cavity of a forming tool. Traditionally the plug assist has been made of wood, metal, solid plastic, etc., but each has significant disadvantages. Primarily each of these suffer from their relatively high thermal conductivity which removes heat from the molten web and thus adversely affects the stretching of the molten web to be formed into a high quality part. Examples of such adverse affects would include, uneven draw-down (variations in appearance and wall thickness), surface roughness and haziness. These deficiencies may be at least partially overcome through the use of internal or external heating of the plug or employing a multi-component plug but this adds complexity to the device, to the operation and increases the operating cost.

For this reason the industry has found advantages to using syntactic foam materials, or also referred to herein as syntactic material. These are foams formed by incorporating preformed hollow particles in a resin matrix. Examples of these hollow particles would include glass or ceramic hollow microspheres. Although there are prior art references directed to syntactic foams, to the best of our knowledge only thermoset (e.g. epoxy and polyester) matrices have been used for making plug assists. This is presumably due to the easy manner in which such foams can be made. The low specific heat and low thermal conductivity of these syntactic foams has been found to resolve many of the recognized processing and economic problems associated with solid plug assist tools. However, these plug assists lack the mechanical toughness desired for the application. They are easily damaged during the operation or during the frequent tool changes typical of their usage and once a dent or chip occurs in a critical area, the tool is unacceptable and must be reworked or scrapped. In addition, it is difficult to machine a brittle epoxy form. The thermoset syntactic foam can chip during machining and the removed materials turn to dust. The dust created leads to special set-ups, and the high potential for the syntactic material including the hollow micro-spheres getting into bearings, etc. Once this occurs, machine wear issues are created. Also, most often the machinist must wear protective equipment to avoid dust inhalation and spend additional time to clean up the area after machining.

Although there are recognized advantages and disadvantages to using syntactic materials for plugs, it was believed that the relatively high operating temperature demands of thermoforming operations limited the selection of syntactic materials to thermoset matrix syntactic materials. As noted in international patent application WO 89/00100, which is hereby incorporated by reference, the shortcomings of these inherently brittle thermoset syntactic materials were addressed by coating the syntactic plug with an elastomeric coating.

DISCLOSURE OF THE INVENTION

It has been found that the manufacture of plugs, or plug assists, from tough thermoplastic matrix syntactic foam material overcomes the problems encountered by plugs composed of thermoset materials. It has now been recognized that, since the syntactic materials have low thermoconductivity and the plug designs generally have a fairly high volume to surface area relationship, that thermoplastics having a melting temperature and/or glass transition temperature (Tg) just slightly higher or more above the operating temperature of the thermoforming operation can be used as the matrix material for syntactic plugs. As the more common thermoforming operations are designed for polyethylene and polypropylene materials at temperatures around 165 to 175° C., it is preferred that the thermoplastic resin has at least a melting point or Tg greater than at least 180° C., more preferably at least 200° C. to 500° C., and most preferably at least 210° C. In addition, the thermoplastic syntactic materials offer easy mechanical processing which makes final trimming or on-site modifications of the plug relatively simple.

The physical properties of the thermoplastic materials can be uniquely exploited for making plugs for plug assist thermoforming. The enhanced mechanical toughness of these thermoplastic plugs provides plugs which are more resistant to the chipping and cracking process experienced by thermoset syntactic materials, thus increasing the life and reducing the operation costs of thermoforming, while maintaining the benefits of low specific heat and thermal conductivity associated with syntactic materials.

An additional advantage of the thermoplastic matrix, syntactic foam is its higher tensile and shear strength than thermoset syntactic foam. This attribute makes it possible to consider use of a one piece plug assist which incorporates the threaded base connection. This simplifies and reduces the cost of the plug assist as compared to the multi-piece bonded construction employed for thermoset plug assists. These properties also impart to the resulting plug the advantageous machining properties that are often associated with unfilled thermoplastics. For example, ribbons of continuous and ductile swarf can be removed easily. Furthermore, when working with these materials, no dust masks are needed and clean up is minimal.

A still further advantage of the present invention is achieved when plugs are produced from thermoplastic polyamide compounds which are formed, for instance, from lactams in in situ polymerization. In situ polymerization occurs, for example, when a lactam is combined at an elevated temperature with the hollow filler material and a suitable catalyst directly in a vessel or mold that at least approximates the desired shape of the plug. After polymerization, the mold is removed and a plug is obtained. This process can therefore minimize or avoid the need for additional operations within the manufacturing process, which would normally be necessary if the plug were obtained by conventional extrusion techniques.

Thus, it is an object of this invention to provide an improved syntactic foam plug for plug assist thermoforming wherein such plug is composed of a thermoplastic material having a relatively high melting and/or glass transition temperature. Accordingly, the subject invention encompasses diminishing or removing the undesirable characteristics of thermoset syntactic plugs while increasing the ease by which these articles may be constructed for a given use, by forming such plugs from syntactic foams having a thermoplastic matrix. Other objects and advantages of this invention will become readily apparent from the following written description and appended claims.

Other features and advantages of the present invention will be apparent from the following more detailed description of the preferred embodiments which illustrate, by way of example, the principles of the invention.

DETAILED DESCRIPTION OF THE PRESENT INVENTION

The term thermoplastic resin, as used in this description, is to mean any polymeric material capable of being remolded when heated, more preferably it is a material with a melting point, or glass transition temperature, above 180° C., preferably above 200° C., and still more preferably above 210° C.

The syntactic plug of the present invention may be formed from a syntactic material comprising a thermoplastic resin which serves to bind one or more light-weight hollow fillers. Suitable thermoplastic resins include polyether (including polyetherimide, polyetheretherketone (PEEK), polyetherketoneketone (PEKK)), polyurethane, polyamide (including, for example, polyamideimide), polyacrylates, polycarbonates, polysulphones, copolymers, and mixtures thereof. Preferred resins include polyamides, specifically nylon 6 and nylon 6,6, and polyurethanes.

Suitable hollow filler materials for use in these syntactic materials include any filler used within the art, and obtained from any commercial source. The filler may include generally any material having a density lighter than the density of the resin, more typically the filler includes glass microspheres, hollow polymeric microspheres, hollow ceramic microspheres, microspheres of urea-formaldehyde resin and/or phenol-formaldehyde resin.

The volume percent of the hollow filler in the syntactic material will generally be below 70 vol. %, preferably below 60 vol. %, and even more preferably between 15 and 50 vol. %. The syntactic material may also include various pigments and/or colorants suitable for this purpose as well as other processing additives such as conventional non-hollow fillers.

The syntactic material of the present invention can be formed in any conventional manner, including for example monomer casting, melt compounding, extrusion forming, etc. Preferably, the thermoplastic syntactic plug of this invention is formed by in-situ polymerization of a mixture comprising monomers for the thermoplastic resin and a light-weight filler. In-situ polymerization will preferably include mixing the light-weight filler with a monomer or monomers and thus ensure a uniform distribution of the microspheres in the resulting shaped polymer.

For instance, the syntactic plug may be formed in-situ by polymerization of higher lactams, i.e., lactams containing at least 6 carbon atoms in the lactam ring, as for example, ε-caprolactam, enantholactam, caprylolactam, decanollactam, undecanolactam, dodecanolactam, pentadecanolactam, hexadecanolactam, methylcyclohexanone isoximes, cyclic hexamethylene adipamide, and mixtures thereof; in the presence of an anionic polymerization catalyst, as for example alkali and alkaline earth metals such as lithium, sodium, potassium, magnesium, calcium, strontium, either in metallic form or in the form of hydrides, borohydride oxides, hydroxides, carbonates, organo-metallic derivatives of the foregoing metals, as well as other metals such as butyl lithium, ethyl potassium, propyl sodium, phenyl sodium, triphenylmethyl sodium, diphenyl magnesium, diethyl zinc, triisopropyl aluminum, diisobutyl aluminum hydride, sodium amide, magnesium amide, magnesium anilide, Grignard reagent compounds, such as ethyl magnesium chloride, methyl magnesium bromide, phenyl magnesium bromide. Preferably also a promoter compound such as organic isocyanates, ketenes, acid chlorides, acid anhydrides, and N-substituted imides can be used.

The promoter compound preferably has a molecular weight of less than 1000. The polymerization of the higher lactams is initiated at temperatures of from the melting point of the lactam monomer to 250° C., and preferably from 125° C. to 200° C. As the in-situ polymerization reaction for polyamides is exothermic, the initiation temperature will be exceeded under most conditions. The amount of catalyst and promoter compound used can vary from 0.01 to 20 mole percent, preferably from 0.05 to 5 mole percent and more preferably still from 0.1 to 1 mole percent, all based on the higher lactam being polymerized.

Preferably the thermoplastic plug of the present invention is formed by in-situ polymerization within a mold designed to form the desired plug or a form approximating the design of the desired plug (in which case the molded article could subsequently be shaped). Basically, the process would consist of including microspheres in a reactive lactam monomer containing a catalyst and a promoter in a plug mold, heating this monomer mixture to the temperature where polymerization occurs and letting it polymerize to a solid while the microspheres are uniformly distributed therein.

Coupling agents can be used to pretreat the surface of the hollow filler to improve adhesion to the thermoplastic matrix and further enhance the mechanical properties. Silanes or other coupling agents well known in the art are effective.

Additives such as colorants, lubricants and stabilizers can also be used in the foam to enhance the appearance and performance of the plug. Thermal stabilizers are used since the plug is typically used at the melting point of the plastic materials to be thermoformed, typically 100-200° C.

The materials to be molded by thermoforming and the process by which such molding is carried out can be accomplished by any conventional technique. For example, international patent application WO 89/00100 fully describes such materials and techniques and the full disclosure of these patents is incorporated herein by reference.

Plastic materials especially suited to vacuum thermoforming techniques utilizing the plug of the present invention are: polyethylene, polystyrene, polyvinylchloride, and polypropylene. The materials may be formed into cups, buckets or various other vessel shaped articles by thermoforming such plastic materials using the plug of the present invention.

A typical process for the polymerization of syntactic foam plugs comprising nylons includes adding melted caprolactam (monomer) to a closed mixer maintained under nitrogen. The remaining ingredients such as fillers (for example, microspheres), pigments, and additives (except polymerization catalyst) can then be added under nitrogen in such a manner that excludes moisture and air. The temperature of the mixture can then be raised to at least 145° C. and the vessel evacuated to remove entrained air and any other volatiles that may cause porosity in the final product (typically with a vacuum of at least 50 mg Hg, preferably a vacuum of at least 30 mg Hg). The vacuum can be broken by nitrogen and the evacuation can be repeated as necessary (e.g., 2-3 times) until the entrained air and volatiles are sufficiently removed. The mixture is then transferred to a preheated mold (typically preheated to at least 130° C., preferably to at least 145-200° C., more preferably 150-180° C.) for polymerization. The catalyst is generally added to and mixed with the monomer mixture as the material is being transferred into the mold. After polymerization, then solid object is removed from the mold and annealed for stress relief. If necessary, the molded syntactic foam article can then be further shaped to form the desired plug.

EXAMPLES

Examples 1-4 and Comparative Experiment A

A series of nylon syntactic foam samples were made using hollow glass micro-spheres (commercially available from 3M under the trade name Scotchlite Glass Bubbles) and caprolactam, along with a catalyst (sodium lactamate) and an initiator (hexamethylene diisocyanate). The process for forming the samples composed of the formulations set forth in Table 1 is as follows. The caprolactam monomer was melted and added to a closed mixer maintained under nitrogen. The remaining ingredients (except the catalyst) were added under nitrogen in such a manner that excludes moisture and air. The mixture was than heated to 160-170° C. and the catalyst was added to and mixed with the monomer mixture for polymerization. Upon polymerization, the solid object was then removed and annealed for stress relief. The thermal conductivity values for each sample was tested and reported also in Table 1. The melting point of the nylons was 210° C.

TABLE 1

| Examples | Resin | Volume % glass micro-spheres and type | Thermal Conductivity* (W/m ° K) |
|---|---|---|---|
| Comparative A** | Nylon 6 | Unfilled | 0.25 |
| 1 | Nylon 6 | 30 Vol. % of K20 microspheres (specific gravity 0.20, average diameter 65 µm) | 0.23 |
| 2 | Nylon 6 | 55 Vol. % of K20 microspheres (specific gravity 0.20, average diameter 65 µm) | 0.18 |
| 3 | Nylon 6 | 55 Vol. % of K1 microspheres (specific gravity 0.125, average diameter 65 µm) | 0.17 |
| 4 | Nylon 6 | 45 Vol. % of K20 microspheres (specific gravity 0.22, average diameter 40 µm) | 0.19 |

Notes:
*Measurements performed in accordance with ASTM E-1530
**Unfilled thermoplastic polyurethane resins were also tested and had a Thermal Conductivity of 0.35 W/m ° K Example 5

Syntactic foam plugs were prepared on an industrial scale from the formulation set forth in Table 2-A. The industrial scale process for the polymerization included adding melted caprolactam (monomer) to a closed mixer maintained under nitrogen. The microspheres filler, initiator, stabilizer and pigment were added under nitrogen in such a manner that excludes moisture and air. The temperature of the mixture was then raised to 145° C. and the vessel evacuated to less than 25 mm Hg to remove entrained air and other volatiles. The vacuum was broken with nitrogen and the evacuation cycle was repeated 2-3 times. The mixture was then transferred to a mold preheated to 160-170° C. for polymerization. The catalyst was added to and mixed with the monomer mixture as the material was being transferred into the mold. After polymerization, the solid object was removed from the mold and annealed for stress relief.

TABLE 2-A

|  | Weight, lbs. (Kg) | Weight (%) |
|---|---|---|
| Caprolactam | 56.65 (25.72) | 79.78 |
| K20 Glass | 9.3 (4.22) | 13.10 |
| Initiator solution | 1.13 (.513) | 1.60 |
| Catalyst solution | 3.09 (1.40) | 4.35 |
| Heat stabilizer | 0.17 (.077) | 0.24 |
| 901 (blue) pigment | 0.66 (.299) | 0.93 |
|  |  | 100% |

The properties of the plugs were tested, in accordance with the ASTM test methods, and are reported in the following Table 2-B.

TABLE 2-B

| Property | Example 1 | ASTM |
|---|---|---|
| Density (ρ) | 720 (kg/m$^3$) | D-792 |
| Coefficient of Thermal Expansion (CTE) (21-150° C.) | $26 \times 10^{-6}$ in/in/° F. ($47 \times 10^{-6}$ m/m/° C.) | E-831 |
| Compressive Strength | 6,512 psi [44.9 Mpa] | D-645 |
| Compressive Modulus | 231 Kpsi [1.59 Gpa] | D-645 |
| Service Temperature | 351° F. [180° C.] | N/A |

When these plugs were used in a thermoforming process for forming polypropylene cups, the resulting cups were extremely clear (transparent without haze) with more uniform wall thickness as compared with cups resulting from a process using unfilled polyurethane plugs.

Example 6

Industrial scale plugs were prepared in a thermoforming process from a formulation corresponding to Example 4 (45 Vol. % of S22 microspheres) having properties as shown in Table 3.

TABLE 3

| Property | Example 5 | ASTM |
|---|---|---|
| Density (ρ) | 43-47 lb/ft$^3$ [740 kg/m$^3$] | D-792 |
| Specific Heat ($C_p$) per mass | 0.43 BTU/lb · ° F. [1.80 kJ/(kg · ° C.)] | E-1530 |
| Coefficient of Thermal Expansion (CTE) (21-150° C.) | $28 \times 10^{-6}$ in/in/° F. [$50 \times 10^{-6}$ m/m/° C.] | E-831 |
| Compressive Strength | 6,300 psi [43.4 Mpa] | D-645 |
| Compressive Modulus | 180 Kpsi [1.24 Gpa] | D-645 |
| Service Temperature | 350° F. [180° C.] | N/A |

The invention claimed is:

1. A method of thermoforming, comprising:
   providing a thermoplastic syntactic foam plug assist tool comprising a density of between about 0.35 g/cm³ to about 0.95 g/cm³, a melting point and/or a Tg at least 5° C. higher than a thermoforming operation design operating temperature, and a hollow filler having a lower density than the thermoplastic resin;
   disposing the thermoplastic syntactic foam plug assist tool in a mold; and
   thermoforming an article in the mold using the plug assist tool.

2. The method of claim 1, wherein the syntactic foam comprises between 15 vol. % and 70 vol. % of the hollow filler.

3. The method of claim 1, wherein the hollow filler includes glass microspheres, hollow polymeric microspheres, hollow ceramic microspheres, microspheres of urea-formaldehyde resin and/or phenol-formaldehyde resin.

4. The method of claim 1, wherein the plug assist tool is a one-piece plug assist tool.

5. The method of claim 1, wherein the thermoplastic resin has a melting point and/or Tg of greater than 180° C.

6. The method of claim 1, wherein the thermoplastic resin comprises a polyamide, polycarbonate, polyurethane, polyester, polyacrylate, and/or copolymers and/or mixtures thereof.

7. The method of claim 1, wherein the thermoplastic syntactic foam plug assist tool consists essentially of the thermoplastic resin and the hollow filler.

8. The method of claim 1, wherein the thermoplastic syntactic foam plug assist tool consists of the thermoplastic resin and the hollow filler.

9. A method of thermoforming, comprising:
   disposing a thermoplastic syntactic foam plug assist tool in a mold, the plug assist tool comprising a density of about 0.6 g/cm³ to about 0.9 g/cm³ and a thermal conductivity of about 0.17 to about 0.23 W/m° K; and
   thermoforming an article in the mold using the plug assist tool;
   wherein the thermoplastic syntactic foam plug assist tool comprises a thermoplastic resin and a hollow filler, the thermoplastic resin comprising a melting point and/or Tg at least 5° C. higher than a design operating temperature of the thermoforming operation, and the hollow filler having a density lower than the thermoplastic resin.

10. A method of thermoforming, comprising:
    disposing a non-thermosetting syntactic foam plug assist tool in a mold, the plug assist tool comprising a density of about 0.35 g/cm³ to about 0.95 g/cm³; and
    thermoforming an article in the mold using the plug assist tool;
    wherein the non-thermosetting syntactic foam plug assist tool comprises a thermoplastic resin and a hollow filler, the thermoplastic resin comprising a melting point and/or Tg at least 5° C. higher than a design operating temperature of the thermoforming operation, and the hollow filler having a density lower than the thermoplastic resin.

11. The method of claim 1, wherein the density of the plug assist tool is about 0.6 g/cm³ to about 0.9 g/cm³.

12. The method of claim 1, wherein the plug assist comprises a thermal conductivity of about 0.17 to about 0.23 W/m° K.

13. The method of claim 10, wherein the density of the plug assist tool is about 0.6 to about 0.95 g/cm³.

14. The method of claim 10, wherein the plug assist comprises a thermal conductivity of about 0.17 to about 0.23 W/m° K.

15. The method of claim 1, wherein the density of the plug assist tool is about 0.59 g/cm³ to about 0.86 g/cm³.

16. The method of claim 9, wherein the density of the plug assist tool is about 0.59 g/cm³ to about 0.86 g/cm³.

17. The method of claim 10, wherein the density of the plug assist tool is about 0.59 g/cm³ to about 0.86 g/cm³.

18. A method of thermoforming, comprising:
    providing a thermoplastic syntactic foam plug assist tool comprising a density of between about 0.35 g/cm³ to about 1.23 g/cm³, a melting point and/or a Tg at least 5° C. higher than a thermoforming operation design operating temperature, and a hollow filler having a lower density than the thermoplastic resin;
    disposing the thermoplastic syntactic foam plug assist tool in a mold; and
    thermoforming an article in the mold using the plug assist tool.

19. The method of claim 18, wherein the syntactic foam comprises between 15 vol. % and 70 vol. % of the hollow filler.

20. The method of claim 18, wherein the density of the plug assist tool is about 0.59 g/cm³ to about 0.86 g/cm³.

21. The method of claim 18, wherein the plug assist comprises a thermal conductivity of about 0.17 to about 0.23 W/m° K.

22. The method of claim 18, wherein the hollow filler includes glass microspheres, hollow polymeric microspheres, hollow ceramic microspheres, microspheres of urea-formaldehyde resin and/or phenol-formaldehyde resin.

23. The method of claim 18, wherein the plug assist tool is a one-piece plug assist tool.

24. The method of claim 18, wherein the thermoplastic resin has a melting point and/or Tg of greater than 180° C.

25. The method of claim 18, wherein the thermoplastic resin comprises a polyamide, polycarbonate, polyurethane, polyester, polyacrylate, and/or copolymers and/or mixtures thereof.

26. The method of claim 18, wherein the thermoplastic syntactic foam plug assist tool consists essentially of the thermoplastic resin and the hollow filler.

27. The method of claim 18, wherein the thermoplastic syntactic foam plug assist tool consists of the thermoplastic resin and the hollow filler.

* * * * *